Sept. 29, 1953  D. H. CLEWELL  2,653,471
THERMOACOUSTIC GAS ANALYZER
Filed June 14, 1948  4 Sheets-Sheet 1
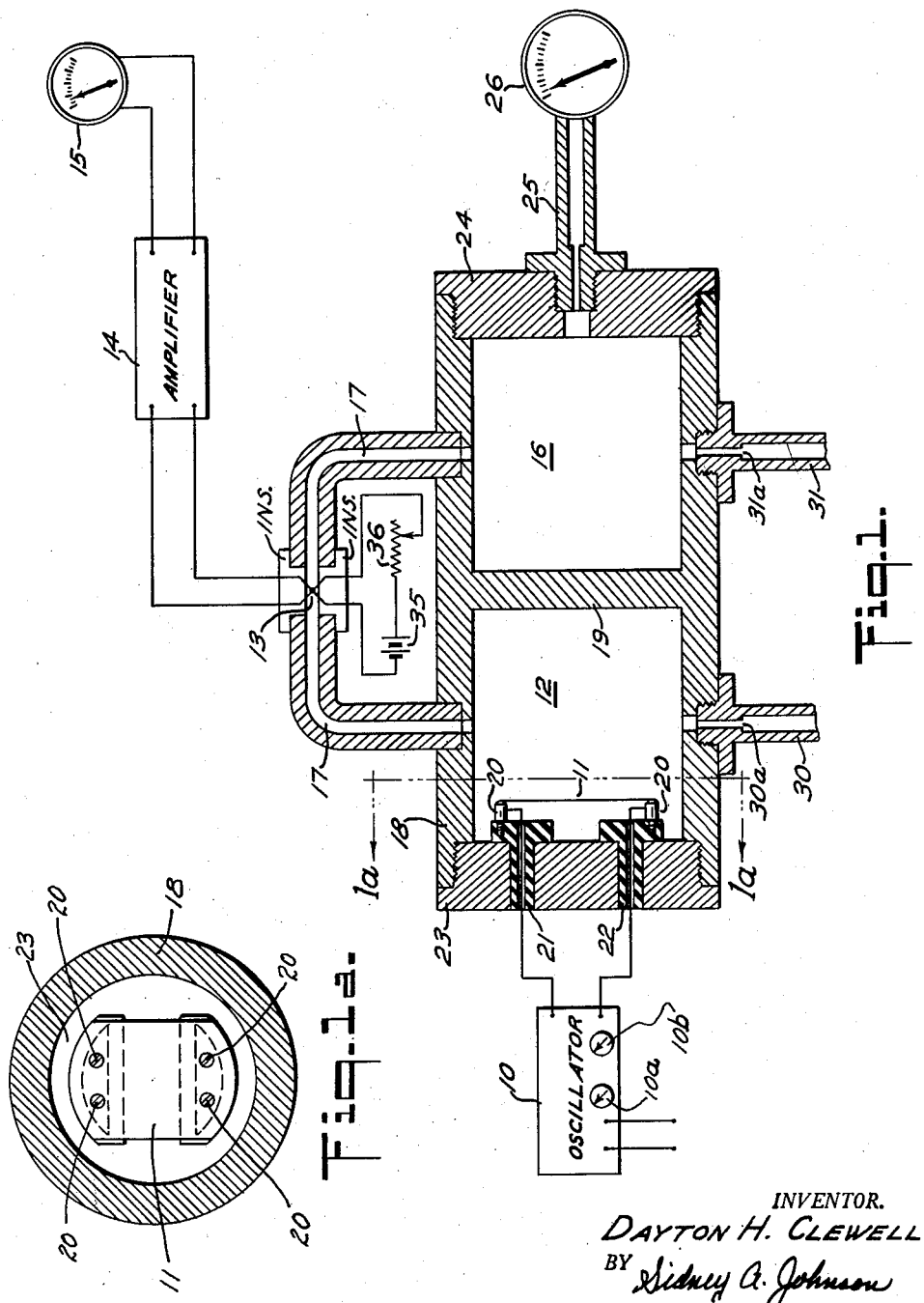
INVENTOR.
DAYTON H. CLEWELL
BY Sidney A. Johnson
ATTORNEY

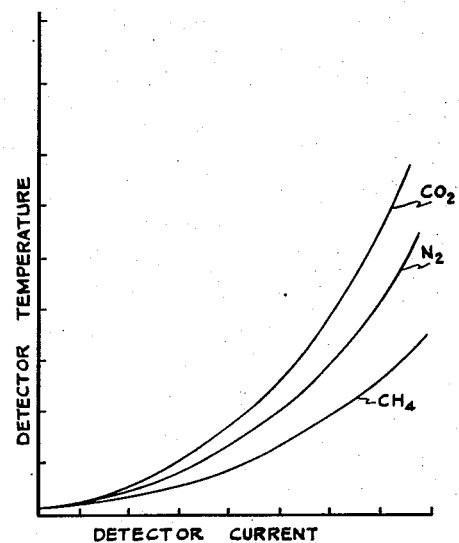
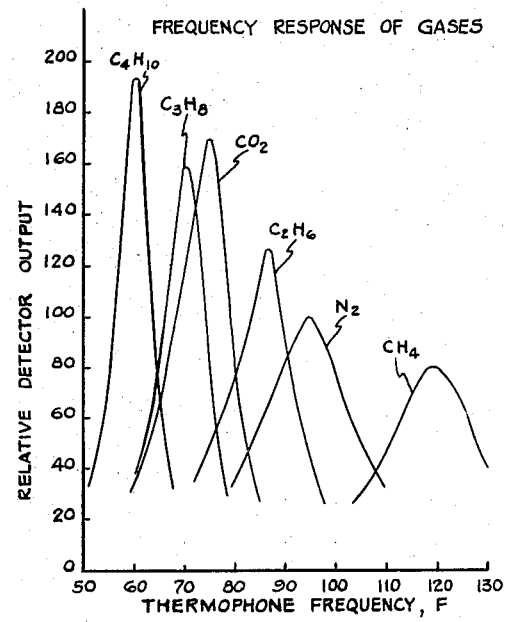
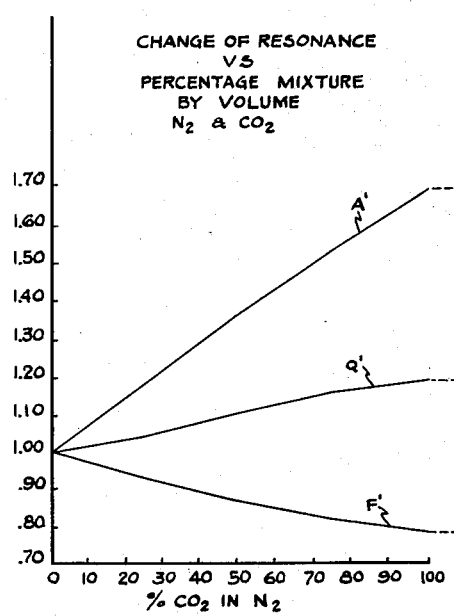
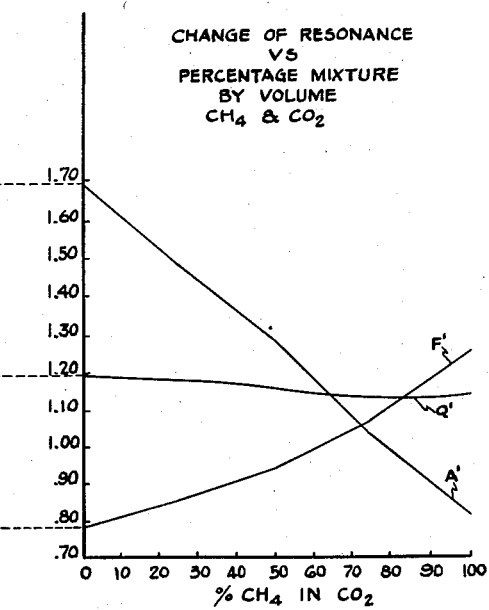

Sept. 29, 1953

D. H. CLEWELL 2,653,471

THERMOACOUSTIC GAS ANALYZER

Filed June 14, 1948

RESOLUTION CHART FOR $N_2$, $CH_4$, $CO_2$

INVENTOR.
DAYTON H. CLEWELL
BY
Sidney A. Johnson
ATTORNEY

Sept. 29, 1953     D. H. CLEWELL     2,653,471
THERMOACOUSTIC GAS ANALYZER
Filed June 14, 1948     4 Sheets-Sheet 4
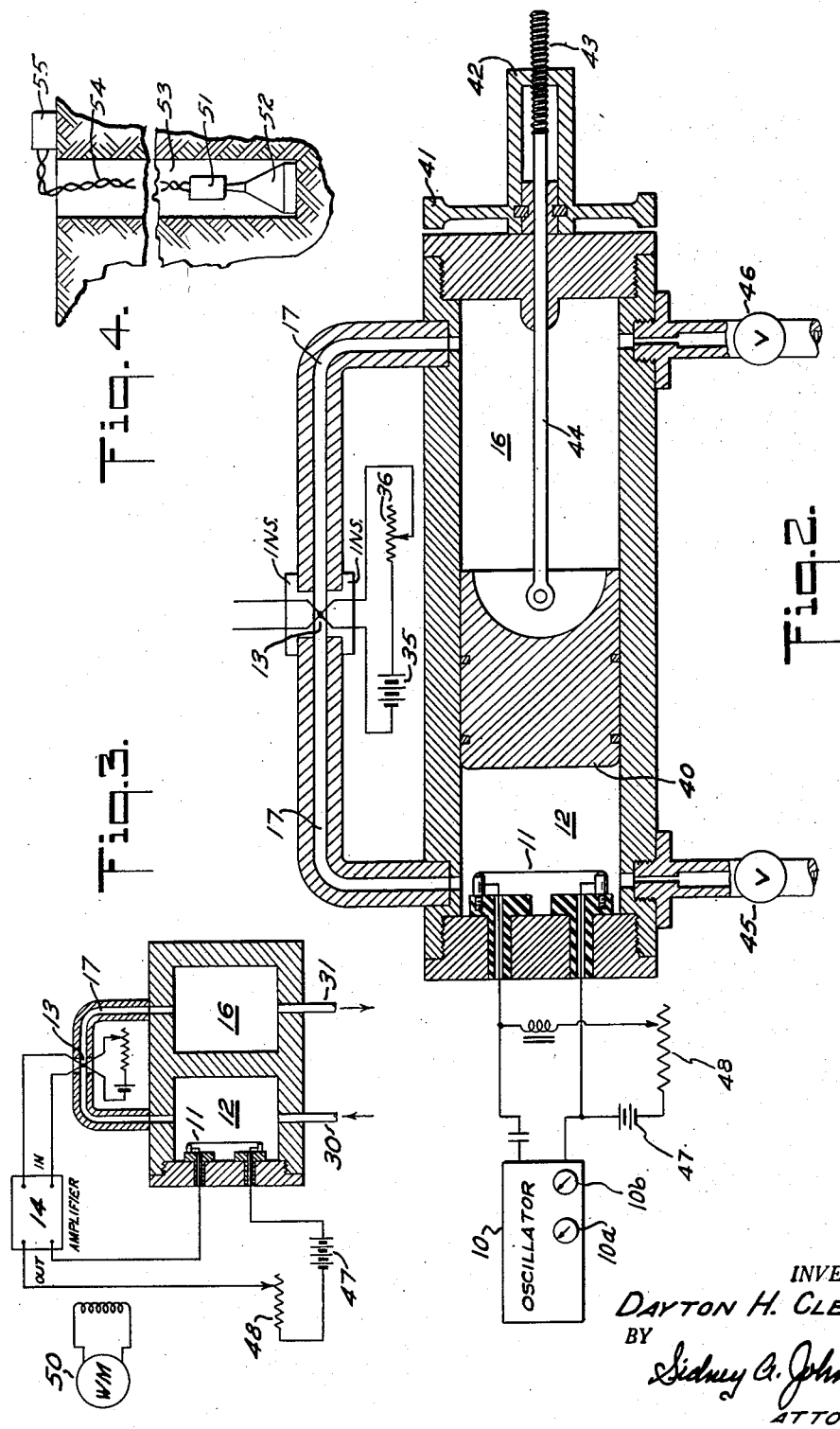
INVENTOR.
DAYTON H. CLEWELL
BY
*Sidney A. Johnson*
ATTORNEY Patented Sept. 29, 1953

2,653,471

UNITED STATES PATENT OFFICE 2,653,471

THERMOACOUSTIC GAS ANALYZER

Dayton H. Clewell, Dallas, Tex., assignor, by mesne assignments, to Socony-Vacuum Oil Company, Incorporated, New York, N. Y., a corporation of New York Application June 14, 1948, Serial No. 32,863

5 Claims. (Cl. 73—24)

This invention relates to gas analyzing systems and has for an object the method and means for identifying gases by measurement of certain physical properties thereof.

The analysis of gases may be accomplished by one of several processes. Chemical analyses, fractionation, radiation absorption and mass spectrographic methods are most widely used. However, where gas mixtures made up of several component gases are to be analyzed, the usual methods have the decided disadvantages of being tedious and time consuming and, in general, they require expensive apparatus.

In contrast to such methods the present invention utilizes measurements of the physical properties of a gas column, and in one form thereof comprises generating pressure variations in an acoustic resonator at a rate which produces resonant vibration. Characteristics of the generated oscillations are then measured for determination of the desired properties of the gas within the resonator. More specifically, the resonator comprises two chambers interconnected by a flow channel. A generator in one chamber produces pressure variations therein, the frequency of which may be varied. The frequency of the pressure variations is then varied until the pressure variations attain resonance. A detector, suitably located, responds to the oscillation of the column of the gases between the two chambers and affords a ready and accurate means of measuring the amplitude, the Q, and the frequency of the system.

In accordance with the invention, the relative amounts of the different constituents of a gas mixture and their identity may be determined without altering the composition and without changing the physical properties of the mixture. The operation is such that continuous gas analyses may be made with respect to various processes, such as analysis of soil gases, gases from drilling muds, flue gases, the products of alkylation processes, thermal and catalytic cracking, the Fisher-Tropsch process and the analysis of the products from natural and producer gas wells.

For a more detailed disclosure of the invention and for further objects and advantages thereof, reference is to be had to the following description taken in conjunction with the accompanying drawings, in which:

Fig. 1 is a sectional elevation and wiring diagram of an apparatus embodying the invention;

Fig. 1a is a sectional view taken along the line 1a—1a of Fig. 1;

Fig. 1b is a graph of the temperature of the thermocouple 13 for three different gases;

Fig. 1c is a graph of amplitude of vibration as a function of frequency for several different gases;

Fig. 1d is a graph showing the variation in resonant frequency, amplitude of vibration at resonance, and "Q" for mixtures of nitrogen and methane;

Fig. 1e is a graph showing the variation in resonant frequency, amplitude of vibration at resonance, and "Q" for mixtures of methane and carbon dioxide;

Fig. 2 is a sectional elevation, including a part of the wiring diagram, of a modified form of the invention;

Figure 1F:
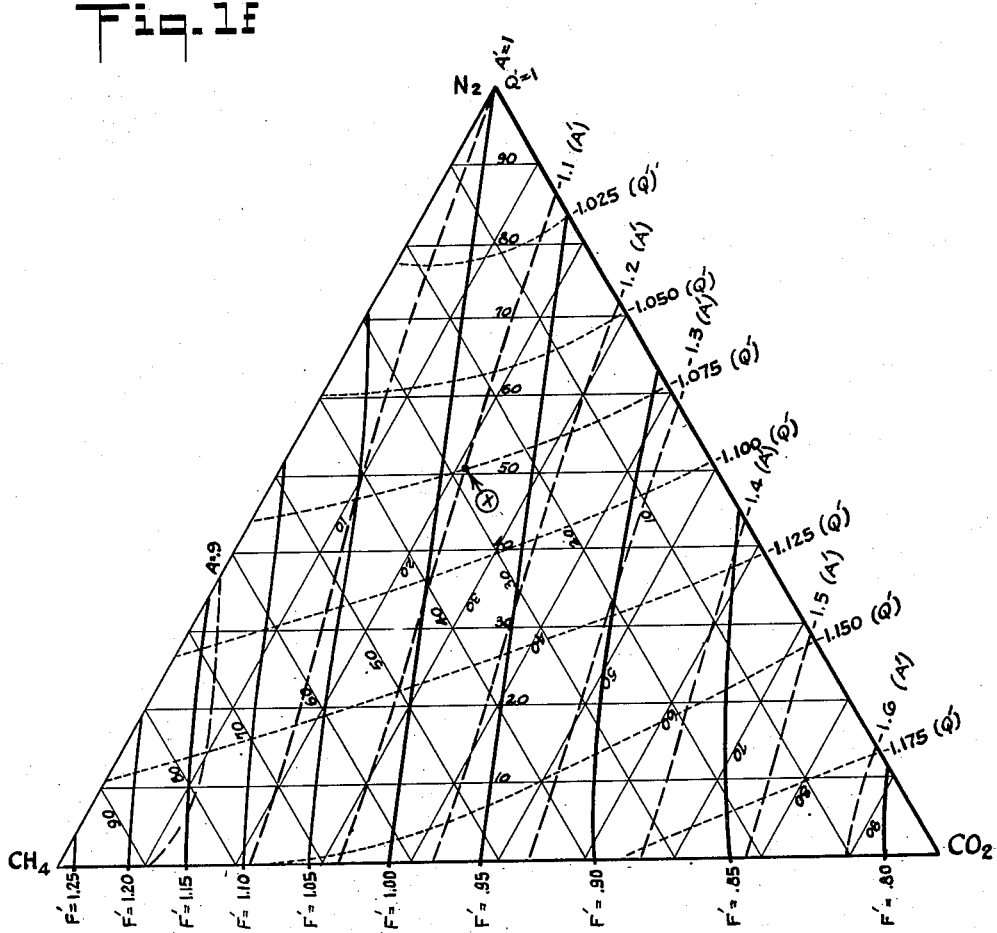
Fig. 1f is a triangular representation of data taken from Figs. 1d and 1e.

Fig. 3 diagrammatically illustrates a further modification of the invention; and Fig. 4 diagrammatically illustrates the invention applied to the measurement of soil gases.

Referring to the drawings, the principal elements of the gas analyzing system of Fig. 1 comprise a variable frequency oscillator 10, a thermophone 11, of gold foil, connected thereto and disposed within a chamber 12, a hot-wire microphone 13, an amplifier 14, an output meter 15, and the chamber 16 flow-connected by the tubular channel 17 with the chamber 12. The chambers 12 and 16 shown as cylindrical are readily formed by a tubular member 18 having a suitable dividing wall 19 intermediate the ends thereof. The thermophone 11 extends between mounting studs 20 carried by bushings 21 and 22 formed of insulating material. These bushings are carried by a closure member 23 for the chamber 12. Extending from a similar closure member 24, for the chamber 16, is a pipe 25 leading to a pressure gauge 26.

Gas to be analyzed is introduced into the chamber 12 by means of a supply pipe 30, which, it will be observed, is connected to the chamber 12 by means of a small-bore or capillary opening 30a. For purging purposes, or for continuous flow of a gas to be analyzed, an exit pipe 31 is connected to the chamber 16. It is also provided with a small-bore or capillary opening 31a. When measurements or analyses are being made in applications in which a continuous flow of gas passes through the analyzer, the capillary openings 30a and 31a act as low-pass filters which eliminate radiation of energy from the system. It is to be further observed that the flow channel 17 is of uniform cross section and its cross-sectional area and volume are small in comparison with that of the chambers 12 and 16. The lines 30 and 31 may include valves to provide for batch operation; that is, the chambers 12 and 16 and flow channel 17 will be evacuated and then charged with a gas to be analyzed.

Assuming now that the apparatus has been suitably evacuated and that it has been charged with a gas to be analyzed, and that suitable valves, such as valves 45 and 46 of Fig. 2, have closed the pipes 30 and 31, the oscillator 10 will then be energized and the frequency thereof adjusted until the meter 15 indicates that the thermally-generated pressure variations are a maximum within the flow channel 17. The pressure variations are generated by the temperature changes of the thermophone 11. The flow of current through the foil of the thermophone during each half cycle of the alternating current produces a rapid rise and fall of its temperature. The foil is designed to have substantial area, Fig. 1a, and a very low heat capacity, having a thickness of the order of $12 \times 10^{-6}$ centimeters. Thus, its temperature follows, or varies with, the increasing and decreasing currents which characterize pulsating or alternating currents. Accordingly, the changing temperature of the thermophone 11 generates pressure variations within the chamber 12, pressure variations like or characteristic of sound waves. At a particular frequency, the column of gas in the flow channel 17 will oscillate in resonance with the thermal sound source. This amplitude of vibration of the gas column, between the two chambers 12 and 16, at resonance will be materially above, from two to twenty times as great as, the non-resonant amplitude.

The hot-wire microphone or detector 13 comprises a thermocouple-cross formed by two dissimilar fine wires. One circuit thereof is suitably energized from a source such as the battery 35 under the control of a variable resistor 36. The output of thermocouple 13 which varies with temperature is applied to the input circuit of amplifier 14. The oscillation of the gas in the flow channel, by its alternate to and fro motion, produces variable heating and cooling of the thermocouple, and its voltage registers or follows the temperature changes. When the gas is at maximum velocity, heat will be conducted from the thermocouple 13, thus lowering its temperature. During phases of the cycle of oscillation when the gas is at rest, the loss of heat will be greatly reduced causing a temperature rise. After amplification by the amplifier 14, variations in the output of the thermocouple will be indicated on the meter 15.

In accordance with the invention, definite information may be obtained with respect to a number of the physical properties of a gas by means of which a single gas, the several components of a mixture, or the type of mixture itself may be identified. Though other factors contribute, the resonant frequency varies as a function of the ratio of the specific heats of the gas and with the density thereof. With a thermal element as the source of vibrations the amplitude at resonance will be largely determined by the thermal diffusivity and the viscosity of the gas. For vibrations in the flow channel 17, the rate of change of the phase angle with change in frequency will also be largely determined by the viscosity of the gas, while the temperatures of the thermophone 11 and of the hot-wire microphone 13, with the gas at rest, will be largely dependent upon the thermal conductivity of the gas. The variation in the temperature of the thermocouple-cross of the detector element 13 with thermal conductivity of the gas is illustrated in Fig. 1b. Curves of the filament temperature for three different gases are shown. Since methane, $CH_4$, has the highest value of thermal conductivity, the curve of the temperature of element 13 is lower than the curves for either nitrogen, $N_2$, or carbon dioxide, $CO_2$, as illustrated. There is a substantial difference between each of the curves. Consequently, a determination of the thermal conductivity of a gas would be one measure of the character of the gas. If a gaseous mixture were to comprise 50% nitrogen and 50% methane, the thermal conductivity curve for the mixture would lie about halfway between the curves $N_2$ and $CH_4$. Similarly, there would be a different curve for different mixtures of gases.

The manner in which the resonant frequency varies with different gases is illustrated in Fig. 1c where thermophone frequency has been plotted as abscissae and relative detector output has been plotted as ordinates. The resonant curve for butane, $C_4H_{10}$, is sharply resonant at 60 cycles with a very high amplitude as compared with the other gases. The resonant curve for propane, $C_3H_8$, is sharply resonant at 70 cycles, while the resonant curve, $CO_2$, for carbon dioxide reaches a maximum at approximately 74.5 cycles. Similarly, the ethane curve, $C_2H_6$, nitrogen curve, $N_2$, and the methane curve, $CH_4$, show maximum values at frequencies of approximately 88.5, 94.5 and 119 cycles per second. The resonant frequency for each of the above gases is different, and there is also substantial difference in the amplitude of the oscillations for the resonant frequency characteristic of each of the gases. In this connection it is to be understood, of course, that all tests were made under the same conditions, namely under a pressure of 65.7 cm. Hg., a temperature of 36.5° C., and with the same input to the thermophone.

Inasmuch as there is a distinct resonant frequency for each gas, it has been found that the amplitude, the frequency and the "Q of the resonant curve" will vary in characteristic manner for mixtures of gases.

The "Q" of each resonant curve is a measure of the sharpness of resonance. Mathematically, it may be expressed as:

(1) $$Q = \frac{F}{F_2 - F_1}$$

where:

F is resonant frequency;
$F_2$ is the upper frequency yielding an output amplitude of 0.707 of the amplitude at resonance, and
$F_1$ is the lower frequency yielding 0.707 of the amplitude at resonant frequency.

In Fig. 1d the percentage of carbon dioxide in nitrogen has been plotted as abscissae against the change in resonance as ordinates. For example, pure nitrogen was in the analyzer at zero abscissa (zero carbon dioxide in nitrogen). The data plotted in Figs. 1d and 1e are relative values with pure nitrogen taken as a standard or reference gas. The values plotted may be defined in the following manner:

(2) $$F' = \frac{Fm}{FN_2} = \frac{\text{resonant frequency of the mixture}}{\text{resonant frequency of } N_2}$$

(3)
$$A' = \frac{Am}{AN_2} = \frac{\text{amplitude of vibration of the mixture at resonance}}{\text{amplitude of vibration of } N_2 \text{ at resonance}}$$

(4)
$$Q' = \frac{Qm}{QN_2} = \frac{Q \text{ of the resonance curve of the mixture}}{Q \text{ of resonance curve for } N_2}$$

Accordingly in Fig. 1d curves A', Q' and F'' have the value indicated as 100% for zero abscissa. If the percentage of carbon dioxide in the nitrogen rises to 100%, the amplitude function (A') in terms of detector output rises linearly to 170% of the initial value. Similarly, the resonant frequency function (F'') decreases in a characteristic manner, while there is a characteristic rise in the value of Q'.

The same distinctive relationships are also found, as shown in Fig. 1e, where the percentage of methane in carbon dioxide is plotted as abscissae against output as ordinates. Since the value of zero abscissa in Fig. 1e corresponds with the 100% value of Fig. 1d, it will be noticed that the measured output values are the same. However, as methane is added the amplitude function (A') rapidly decreases, while the value of the resonant frequency function (F'') rises. There is a decrease in the value of Q'. It will now be apparent that the several gases and the several mixtures have characteristics, which if known or measured, may be used not only to identify the qualitative character of the gases, but also to determine the quantitative composition of the gases or gas mixtures.

The characteristic curves of Fig. 1c of themselves contain the information shown in Figs. 1d and 1e. For example, it will be seen that the amplitude of vibration of carbon dioxide, $CO_2$, is much higher (170%) than the amplitude of $N_2$ at their respective resonant frequencies. Fig. 1d shows that for mixtures of carbon dioxide in nitrogen the change in amplitude at resonant frequencies for changes in percentage of one gas with respect to the other is a substantially linear relationship, and is characteristic of a mixture of these two gases. A similar deduction can be made with reference to frequency by comparing Figs. 1c and 1d.

In accordance with the invention, advantage is taken of the fact that the measured and calculated quantities are functions of properties of the gas in the analyzer. The resonant frequency, F, is mainly influenced by the velocity of sound in the gas. The sharpness of resonance, Q, is mainly influenced by the viscosity of the gas. The peak amplitude, A, is a function of both thermal conductivity, the frequency F, and Q. The viscosity and the thermal conductivity are functions of basic properties or conditions of the gas, namely molecular weights, temperature, molecular diameter and specific heats. The analyzer provides a novel and convenient method and apparatus for measuring properties of gases by means of which qualitative and quantitative analyses may be made.

As above explained, after the introduction of a sample of a gas or gaseous mixture, the oscillator 10 is adjusted as by control knobs 10a and 10b to develop in the ribbon or foil of the thermophone 11 a current of predetermined amplitude and frequency. Preferably the frequency is then varied, with the amplitude of the input current remaining at its predetermined value, over a range which will yield on the output meter 15 values of the maximum amplitude at the resonant frequency, and the amplitude at 0.707 the amplitude at resonance. The frequencies for the foregoing points are recorded, and information is at hand for identification of the gases in the analyzer. It will be found, in general, convenient to obtain sufficient data for the plotting of curves corresponding with one of those of Fig. 1c.

The analyzing apparatus comprising the chambers 12 and 16, of course, constitutes an acoustic resonator of the Helmholtz type. The gas within the flow channel 17, as a whole, is made to oscillate due to the resonant condition between chambers 12 and 16. The system has a natural frequency of oscillation determined by the mass of the gas in the flow channel 17 and the cushioning effect of the gas in the chambers 12 and 16. For simplicity of explanation, it will be assumed, and it is generally preferable that, the thermophone generates the variations in pressure of the form:

(5) $$p = P \sin 2\pi ft$$

where:

P is the peak value of the pressure
$t$ is time
$f$ is frequency

The amplitude of oscillation of the gas at resonance is:

(6) $$A = \frac{aP}{2\pi Fb}$$

where:

$a$ is the cross-sectional area of the flow channel 17
P is the peak value of the pressure
F is the resonant frequency
$b$ is the damping coefficient.

For a given system in which the pressure variations are generated by thermal means the maximum pressure (P) may be expressed:

(7) $$P \approx \frac{VK}{F^{\frac{3}{2}}}$$

where:

K is the thermal diffusivity.

Further, from Helmholtz' theory of resistance offered to oscillations of a viscous medium in a tube or flow channel, the damping coefficient $b$, Equation 6 may be expressed:

(8) $$b = 2\pi^{\frac{3}{2}} lr \sqrt{\rho \mu F}$$

where:

$r$ is the radius of the flow channel
$l$ is the length of the flow channel
$\mu$ is the viscosity of the medium
$\rho$ is the density of the medium.

It will be seen that if Equations 7 and 8 are combined with Equation 6, the amplitude of vibration at the resonant frequency for any gas is dependent upon three basic properties:

K (thermal diffusivity)
$\rho$ (density); and
$\mu$ (viscosity).

In addition to the above discussed effect, viscosity ($\mu$) is the property of the gas which mainly controls the sharpness of resonance (Q). Thus, two measurements, the amplitude of vibration at resonance (A) and the sharpness of the resonant curve (Q) are so controlled by such basic properties of a gas that for different gases the measurements are distinct for, and may be differentiated from, corresponding measurements for any other gas. Such characteristic and distinct measurements may also obtain for gas mixtures as well as for a single gas.

A third measurable variable, the resonant frequency, is affected by, or is a function of, still another basic property of gases as will be evident from the following analysis:

To a first approximation the mass of the slug of gas in the channel 17 is:

(9) $$m = \rho a l$$

where $\rho$ is the density of the gas
$a$ is the cross-sectional area of the flow channel 17
$l$ is the length of the channel.

The stiffness or the cushioning effect of the gas in the two chambers on the gas slug in the flow channel 17 is:

(10) $$s = \gamma P_0 a^2 \left( \frac{V_{12} + V_{16}}{V_{12} V_{16}} \right)$$

where:

$\gamma$ is the ratio of the two specific heats of the gas, $Cp$ and $Cv$ (specific heat at constant pressure and constant volume)
$P_0$ is the average pressure of the gas
$V_{12}$ is the volume of chamber 12
$V_{16}$ is the volume of chamber 16.

From elementary mechanics it is known that the natural frequency of such a system is F where

(11) $$2\pi F = \sqrt{\frac{s}{m}}$$

which, by substitution, Equations 9 and 10, becomes:

(12) $$2\pi F = \left( \frac{\gamma P_0 a (V_{12} + V_{16})}{\rho l V_{12} V_{16}} \right)^{\frac{1}{2}}$$

From the foregoing it will be seen that the resonant frequency depends upon the ratio of the specific heats ($\gamma$) of the gas in addition to its density ($\rho$). The foregoing analyses indicate the wide usefulness of the invention in determining characteristics controlled by the basic properties of the gases. In the system shown, three measurements may readily be made which are distinct for, and characteristic of, a given gas or gas mixture.

Where it is desired or necessary to obtain rapid interpretation of data obtained for a gas or gas mixture through the measurements described above, the resolution chart, Fig. 1f, may be used. It will be observed that the triangular chart may be used for mixtures of three gases, nitrogen ($N_2$), carbon dioxide ($CO_2$) and methane ($CH_4$).

Each apex of the triangular graph with respect to its base which is the side opposite thereto represents 100%. In other words, it represents a pure gas in the analyzer. For example, when viewing the graph such that its base is the line $CO_2$—$CH_4$, the characteristic functions of pure nitrogen are plotted at the apex. More specifically, $F'=1$, $A'=1$ and $Q'=1$. It will be noted that these values correspond to the ordinates of Fig. 1b for pure nitrogen at abscissa equal to zero (zero percent $CO_2$ in $N_2$). The variations of $F'$, $A'$ and $Q'$ shown in Fig. 1b have been plotted along the side $N_2$—$CO_2$ of the triangular graph and describe the transition from pure nitrogen to pure carbon dioxide in the analyzer. In a similar manner the variations of $F'$, $A'$ and $Q'$ of Fig. 1e have been plotted along the base $CO_2$—$CH_4$.

Corresponding values on each of the two sides of the triangular shaped graph have been interconnected, the $F'$ values, by a heavy solid line, the $A'$ values, by a heavy dotted line, and the $Q'$ values, by a light dotted line. Thus, three families of curves are plotted.

The intersection of any two of the curves may be utilized to determine the respective proportions of three components in a gas mixture made up of $N_2$, $CO_2$ and $CH_4$. It is apparent that only two of the measured parameters will be necessary to determine the desired point on the graph, and the third parameter may be used as a check. Since the curves of $F'$ intersect the curves of $Q'$ at a relatively large angle, highest resolution will be obtained by utilizing those two values rather than combinations of $F'$ and $A'$ or $A'$ and $Q'$ which intersect at relatively smaller angles.

To illustrate the advantages of using the chart of Fig. 1f, assume that a mixture of unknown proportions of three gases, $N_2$, $CO_2$ and $CH_4$, is introduced into the analyzer and that the following values are determined from Equations 2, 3, and 4, utilizing the measured parameters resonant frequency (F), amplitude at resonance (A), and the (Q):

$$F' = 0.985$$
$$A' = 1.100$$
$$Q' = 1.075$$

These values determine the common point X on the chart of Fig. 1f. It will be seen that point X corresponds to 51% nitrogen when viewed from base $CH_4$—$CO_2$, 21% $CO_2$ when viewed from the base $N_2$—$CH_4$, and 28% $CH_4$ when viewed from base $CO_2$—$N_2$. Use of the chart of Fig. 1f eliminates the necessity of making several calculations for each measurement taken. With two of the parameters known, the relative proportions of the mixture components may be read directly from the chart.

It has been found that over specific ranges of mixtures of gases, the three parameters, F, A and Q, follow the law of mixtures. No attempt is made in the actual practice of analysis separately to evaluate the fundamental properties, such as density, viscosity, specific heat, etc., of each component of a gas mixture. Only the parameters $F'$, $A'$, $Q'$ are separately determined for each probable component of a gas mixture by successive introduction of pure samples thereof into the analyzer, or calculated from observed values of F, A and Q when known gas mixtures are introduced into the analyzer. For example, if its is assumed that the unknown mixture consists of four gaseous components, the following equations may then be written:

(13) $$F_i I + F_j J + F_k K + F_l L = F$$
(14) $$A_i I + A_j J + A_k K + A_l L = A$$
(15) $$Q_i I + Q_j J + Q_k K + Q_l L = Q$$
(16) $$I + J + K + L = 100$$

where:

I, J, K and L are the percentage partial pressures of the four gases contained in the sample,
F, A and Q are the observed parameters of the gas mixture; and
$F_i$, $A_i$ and $Q_i$ are the values of F, A and Q when the entire sample is composed of I, etc.

The four simultaneous Equations 13–16 may then be solved in conventional manner to determine the composition of the unknown mixture.

Instead of using the parameter Q it is equally feasible to use the parameter $$\frac{d\phi}{dF}$$

where $\phi$ is the phase angle between the motion of the gas in the flow channel 17 and the driving oscillator, since the phase angle is related to frequency (F) and to (Q) in the following manner:

(17) $$Q = \frac{F}{2}\frac{d\phi}{dF}$$

The derivative $$\frac{d\phi}{dF}$$

is measured readily by noting the change in phase ($\Delta\phi$) that accompanies a change ($\Delta F$) in frequency and taking the ratio.

Further in accordance with the invention, the analyzer may be utilized to measure humidity. The density of air ($\rho a$) is given by the equation:

(18) $$\rho a = \frac{.463 \times 10^{-3}}{T}(B - 378e)$$

where:

$\rho a$ is the density in grams per cubic centimeter;
T is the temperature in degrees Rankin;
B is the barometric pressure in millimeters of mercury; and
$e$ is the vapor pressure of water in millimeters of mercury.

The temperature (T) and the barometric pressure (B) may be measured in conventional manner. From Equation 12, the resonant frequency (F) is a function of $$\frac{\sqrt{\gamma P}}{\rho}$$

For air, $\gamma$ is constant. For a given system, the value of the maximum pressure (P) is constant, hence the resonant frequency (F) is proportional to $$\frac{\sqrt{1}}{\rho}$$

It is then apparent that by measurement or determination of the frequency (F) of resonance of the air column in flow channel 17, Equation 18 may be solved to determine the vapor pressure ($e$) of water for a given air sample and humidity determined therefrom.

In the form of the invention illustrated in Fig. 1, it will be remembered that the frequency of the current supplied to the filament 11 was varied until resonance occurred in the flow channel 17. In accordance with the modification of Fig. 2, where corresponding parts have like reference characters, the oscillator 10 may be set to supply a fixed frequency to the filament 11. The volumes of chambers 12 and 16 are made variable by the provision of a piston 40 which may be driven by a knob or wheel 41. The wheel has a threaded hub 42 which engages the threaded end 43 of the piston rod 44. Valves 45 and 46 are provided for control of gases to and from chambers 12 and 16. By rotating the wheel 41 in one direction, the volume of the chamber 12 may be decreased as the volume of the chamber 16 is increased. By rotating the wheel 41 in the opposite direction, the volume of the chamber 16 is decreased while that of chamber 12 is increased. Thus, the relative volumes of chambers 12 and 16 may be changed until there occurs resonant vibration of the column of air in the flow channel 17 at any frequency selected for operation of the oscillator 10.

In utilizing the analyzer of Fig. 2, the relative values of the volumes $V_{12}$ and $V_{16}$ necessary for resonance are found by rotating the wheel 41 until the magnitude of the response from the hot-wire microphone 13 is maximum. Accordingly, the parameter $V_{12}$ may be substituted for F and $\Delta V_{12}$ may be substituted for $\Delta F$. In all other respects, the operation, including the solution of the simultaneous equations will be the same as described in connection with Fig. 1.

The analyzer of Fig. 1 will be preferred where high precision in the construction of the electrical components may be readily attained, while the apparatus of Fig. 2 will be preferred where high precision and skill in mechanical construction are readily available.

It will be remembered from the description of Fig. 1 that the frequency of the oscillations in the flow channel is twice the frequency of the current applied by the oscillator 10. In the modification of the invention shown in Fig. 2, the frequency of vibration in the flow channel 17 is made equal to the frequency of the current applied to the filament 11 by connecting a source of direct current 47 and a variable resistor 48 across the analyzer input. Direct current from the source 47 applies a heat-bias to the foil 11 of such magnitude that the heating caused by the alternating current from the oscillator 10 is superimposed upon the heating effect due to the source 47. Such an arrangement adds stability to the system and provides for more convenient operation.

In the modification of the invention shown in Fig. 3 the output of the detector 13 is applied to the input of the amplifier 14, the output of which is applied to the foil 11, thereby to effect a self-exciting system. Battery 47 and resistance 48 are included in the output circuit of the amplifier and the input circuit or the exciting circuit of the analyzer in order to cause the vibrations in the flow channel 17 to be of the same frequency as the alternating current flowing in the foil 11 as described in connection with Fig. 2.

The effect of the passage of gas through the flow channel 17 is to apply a bias on the hot-wire microphone 13. Its output voltage of course will have the same frequency as that of the oscillations of the gas. Since the frequency of the foil current, of the oscillations of the gas in the flow channel and of the detector output are the same, the system will oscillate at a frequency equal to the resonant frequency of the gas when enclosed in a particular system. By coupling a frequency meter 50 to the system, the value of the resonant frequency may be observed continuously. If desired, the meter 50 may be of the recording and/or controlling type. With controlling features included, the mixture of one gas with another may be placed under the control of the frequency meter 50. Arrangements in which a variable is used to control mixtures are well known to those skilled in the art, and need not be here explained in detail.

The gas analyzing systems herein described embody many desirable features which afford ease and rapidity of operation, and permit rugged construction of an instrument which is readily adaptable to various environments. Thus it may be used to particular advantage in geophysical prospecting where changes in soil gas constituents may be interpreted and relied upon by those skilled in the art to indicate the location of subsurface petroleum deposits. Such a system is shown diagrammatically in Fig. 4.

In this modified form of the invention the analyzer of Figs. 1, 2, or 3 may be mounted in a small container 51 to which there is attached a collecting hood 52 for directing gas into the receiving chamber 12. The collector and housing 51 may be lowered into a bore hole 53 with leadwires 54 serving to connect the analyzer to an amplifying and recording apparatus 55. Gases escaping from the bottom of the bore hole will be collected and directed into the analyzer disposed within the housing 51, and measurements heretofore described made of the constituents thereof. As well understood by those skilled in the art, a relatively high percentage of ethane in general may be taken as indicative of oil deposits below and in the vicinity of the bore hole.

While preferred forms of the invention have been illustrated and described, it is to be understood that other modifications may be made. For instance, the pressure generating device 11 and the detecting device 13 are thermal elements. As well understood by those skilled in the art, other means may be used. For example, a diaphragm suitably positioned and driven would produce the desired pressure variations and other pressure responsive detectors could be utilized to detect those variations. However, thermal elements are utilized for the reason that they accentuate differences between gases, since thermal diffusivity of a gas is then one factor which determines the magnitude of the pressure generated by the unit 11 and the voltage output of the detector 13.

Further, the features of one modification may be utilized with or in substitution for other features of other modifications, all within the scope of the appended claims.

What is claimed is:

1. A gas analyzing apparatus comprising a piston disposed between a pair of gas chambers, a flow channel interconnecting said chambers, thermal means disposed within one of said chambers for producing pressure variations therein, means for adjusting the position of said piston to increase the volume of one chamber while decreasing the volume of the other chamber until the displacements within said flow channel due to said pressure variations are resonant, and means in said flow channel for measuring the amplitude of said displacements therein.

2. A gas analyzing apparatus comprising a cylindrical enclosure for said gas, a piston movably positioned within said enclosure to form two chambers, a flow channel interconnecting said chambers, means disposed within one of said chambers for producing pressure variations therein, a detector in said flow channel for measuring the amplitude of displacements of said gas due to said pressure variations, and means for adjusting the position of said piston to increase the volume of one of said chambers while decreasing the volume of the other chamber until displacements of said gas in said flow channel are resonant.

3. A gas analyzing apparatus comprising a cylindrical enclosure for said gas, a piston movably positioned within said enclosure to form two chambers, a flow channel interconnecting said chambers, a thermal generator in one of said chambers for producing pressure variations therein, a thermal detector in said flow channel for measuring the amplitude of displacements of said gas due to said pressure variations, and means for adjusting the position of said piston in said enclosure to vary the relative volumes of said chambers until displacements of said gas in said flow channel are resonant.

4. A gas analyzing apparatus comprising a cylindrical enclosure for said gas, a piston movably positioned within said enclosure to form two chambers, a restricted flow channel interconnecting said chambers, a thermal filament of large area and low heat capacity in one of said chambers for producing pressure variations therein, an element of low heat capacity disposed within said flow channel, means responsive to changes in temperature of said element produced by said pressure variations for measurement of the amplitude of displacements of gas within said flow channel due to said pressure variations, and means for adjusting the position of said piston in said enclosure to vary the relative volumes of said chambers until said displacements of gas in said flow channel are resonant.

5. Means for analyzing gas in terms of the resonant frequency and sharpness of resonance of an acoustic system containing such gas which comprises a pair of gas chambers, a flow channel interconnecting said chamber, a thin sheet of conducting metal supported within and at one end of one of said chambers, a source of alternating current connected to said thin sheet of conducting metal for distributed current flow therethrough for producing upon current flow pressure variations within said chamber, means for varying the excitation of said thin sheet of conducting metal from said source through a plurality of frequencies including the frequency of resonance of said system, means for measuring said frequencies, and means for measuring the amplitude of the resultant pressure variations at the resonant frequency and at frequencies adjacent resonance for determining an amplitude and an amplitude variation characteristic of said gas.

DAYTON H. CLEWELL.

References Cited in the file of this patent

UNITED STATES PATENTS

| Number | Name | Date |
|---|---|---|
| 1,135,687 | Gwozdz | Apr. 13, 1915 |
| 1,351,356 | Tucker | Aug. 31, 1920 |
| 1,570,781 | Ruben | Jan. 26, 1926 |
| 1,588,170 | Case | June 8, 1926 |
| 2,283,750 | Mickelson | May 19, 1942 |
| 2,521,634 | Janssen et al. | Sept. 5, 1950 |
| 2,536,025 | Blackburn | Jan. 2, 1951 |

FOREIGN PATENTS

| Number | Country | Date |
|---|---|---|
| 6,471 | Great Britain | May 13, 1886 |

OTHER REFERENCES

Text Book, Sand Waves and Acoustics by M. Y. Colby, published by Holt and Co., N. Y. 1934.